May 5, 1931.  W. B. WESCOTT  1,804,042
METHOD FOR PRODUCTION OF PROTEIN PRODUCTS
Original Filed Dec. 5, 1922   2 Sheets-Sheet 1
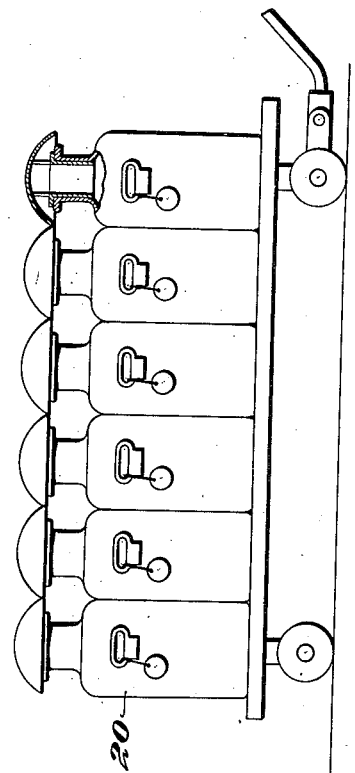
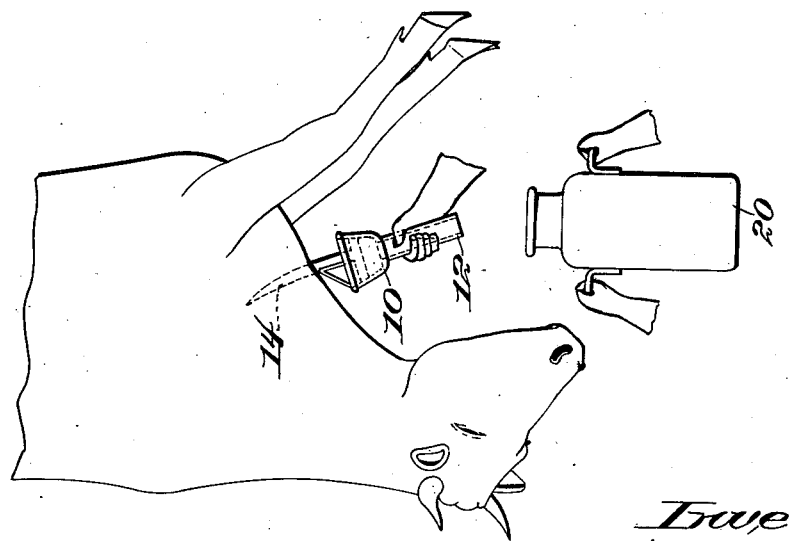

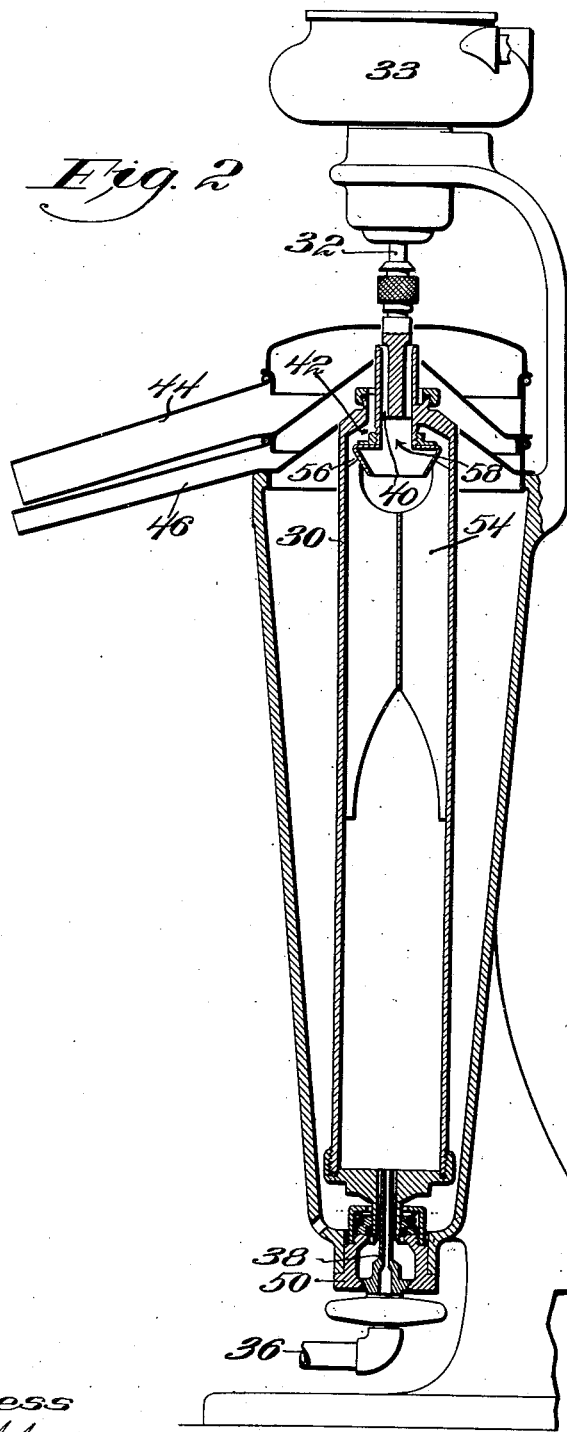

Patented May 5, 1931

1,804,042

UNITED STATES PATENT OFFICE

WILLIAM BURTON WESCOTT, OF WELLESLEY, MASSACHUSETTS, ASSIGNOR TO AMERICAN PROTEIN CORPORATION, OF BOSTON, MASSACHUSETTS, A CORPORATION OF MASSACHUSETTS

METHOD FOR PRODUCTION OF PROTEIN PRODUCTS

Application filed December 5, 1922, Serial No. 605,090. Renewed February 6, 1930.

This invention relates to the production of edible protein products.

In general the object of the invention is to produce edible protein products from the blood of food animals in a commercial, economical and practical manner.

With this primary object in view, one feature of the invention contemplates a novel and commercial method of slaughtering the food animals, particularly beef creatures, to thereby permit the recovery of the blood from a series of animals upon the killing floor of a slaughterhouse without in any way interfering with the routine operations of the slaughterhouse, and at the same time to permit it to be obtained in a condition such that edible products may be produced therefrom.

Another feature of the invention contemplates a process for the production of edible protein products and according to which the blood is taken from a series of food animals as the latter enter upon the killing floor of the slaughterhouse and is handled and subsequently treated in novel and practical ways for the production of edible protein products in both liquid and solid form, all possessing desirable characteristics of cleanliness, of uniformity, color, odor and solubility.

Other features of the invention will be hereinafter described and particularly defined in the claims.

In the drawings, Figure 1 illustrates the method by which the blood is preferably caught and collected during the slaughter of the animals upon the killing floor; and Fig. 2 is a vertical sectional view of one form of centrifuge for treating the blood in accordance with the present invention.

The slaughter of animals for commercial food purposes is a very large industry and because of its size, complexity and low margin of profit, all operations and steps connected with the slaughter of food animals must be exceedingly simple, easy, speedy in execution and economical. Present methods of slaughter are the result of very gradual development over long periods of time and it is unlikely that there will be any revolutionary changes in these methods. Certain it is that any process for rendering the proteins of blood available as foods must fit in with present slaughtering methods and not interfere in any way with present practice. Moreover, the governments of all civilized countries, and more particularly the United States, are passing increasingly drastic laws covering the production of meat foods and meat food products. Any protein foods or food bases derived from blood must satisfy rigid government inspection. The only processes available at present which might be used for treating blood derived from animals at time of slaughter for commercial food purposes do not produce products which comply with existing federal laws nor pass government inspection.

The valuable and nutritious properties of the proteins occuring as constituents of animal blood have been recognized for some time by those who have searched for new foods. The very nature of blood has prevented any extensive use of anything resembling blood in color and form. Not only must the food or food bases derived from blood and the methods by which they are produced be of a character such as to pass rigid government inspection, but also for commercial reasons must the products be sufficiently changed in appearance as to in no way resemble blood. It is desirable in order that their use may extend into the various edible fields, that the products be free from the characteristic odor of meat and of infinitely better keeping qualities than ordinary animal blood. Very small amounts of whole blood are occasionally used in articles of food such as blood pudding, blood sausage and blood bread, but only in foods which are subjected to very thorough sterilization by cooking before use.

Up to the present time it has been impossible to collect animal blood and separate its constituent proteins for use as edible products in a practical commercial way. The separated constituent proteins of blood have not heretofore been available, therefore, as foods or food bases.

Products prepared from blood by usual methods are available only for technical or industrial uses and even such products are not wholly satisfactory because of poor keeping qualities, poor color, low solubility, strong odor, and a marked tendency to change their characteristics with age. The bulk of the slaughterhouse blood produced today is converted into a dry product to be used as fertilizer. In addition to the quantity of slaughterhouse blood which is utilized for fertilizer a relatively small amount of such blood is used for the production of blood sera, commonly known upon the market as blood albumens. These products find use in the textile and leather industries as well as for the production of waterproof veneers. According to usual methods for their production the desired quantity of blood is collected in pails or otherwise in a more or less careless manner during the slaughter of the animal and while the blood is gushing down upon the killing floor. The blood thus collected is permitted to clot in a large shallow vessel, the clot is thereafter cut into small cubes by means of a coarse wire net and the cubes then spread upon a fine wire net to drain. The serum yielded by the contraction of the fibrin in the small cubes is colored red by the free hemoglobin resulting from both the mechanical rupture of the corpuscles during the severance of the clot and also by hemolysis caused by the introduction of extraneous moisture during the collection of the blood. The color of such sera produced by this general method has been slightly improved by collecting the sera from the drainage operation in steps, the first run yielding a deep red product and the second run a product of a lighter red color. These products are oftentimes then passed through a centrifuge in order to clarify them, but because of the manner in which the blood is collected it is contaminated with bacteria such as to render the sera unfit for edible purposes and with sufficient moisture from the drippings from the animal to produce by hemolysis a redness in the final serum which is alone sufficient to prevent their use for edible purposes. The action of the centrifuge has no effect upon this free hemoglobin and the red color may only be removed from such sera by an involved chemical process. In addition to this clotting method the blood may be defibrinated, as by stirring. In this process the fibrin clots about the stirrer and may be subsequently separated from the serum.

The mechanical action of the stirrer upon the red corpuscles operates to free considerable hemoglobin which, together with the amount of hemoglobin freed by hemolysis due to extraneous moisture introduced into the blood during its collection, serves to impart sufficient redness to the resulting serum as to render it entirely unfit for edible purposes.

In addition to the foregoing, immune sera and similar products are produced in special laboratories by taking small amounts of blood of specially treated animals without permanent injury to the animals. The blood thus obtained is manipulated in small individual lots under conditions which are feasible only in special laboratories and which are entirely impractical from the commercial point of view of producing food products. These sera as found upon the market usually contain additional preservatives to prevent their early decomposition.

In its preferred form the invention contemplates the production of edible products from the blood of beef creatures and accordingly a consideration of the essential details of present slaughterhouse practice is now made in order to point out the difficulties of reconciling the recovery of the blood in the desired and necessary condition for the production of such products, with the routine of a modern slaughterhouse. In accordance with the usual slaughtering practice the cattle, after arrival at the slaughterhouse, are usually permitted to rest over night in suitable pens and are driven the next morning through inclined run-ways to the killing pens located adjacent to the killing floor of the slaughterhouse, the latter usually being located at the top of the slaughterhouse. After the animals have been stunned by a blow in the middle of the forehead, and after they have been hoisted on an overhead trolley or rail, the animals are moved out onto the killing floor to the butchering position. At the present time a long butchering knife is used, the point of which is inserted into the neck of the animal as it hangs head down, in such a manner that when the knife is completely inserted and a cut upwardly is made, the main blood channels or arteries are severed near the so-called jugular bifurcation. The operator then withdraws the knife and the blood gushes out from the cut in a large stream. Considerable skill is required in making an accurate cut and one from which the blood will flow freely so that the major part of the blood will have drained from the animal within a very short time, not over a minute. Because of the high development of the by-product end of the packing house business in which practically every available portion of the animal is utilized, it is necessary that the sticking operation be conducted in the above outlined manner in order that certain by-products may not be rendered unfit for their use. For example, if a cut is not correctly made through the hide, this spoils to some extent the selling value of the hide. It is also possible that a careless cut will puncture or sever the gullet or windpipe. This, in addition to interfering with the free flow of blood, destroys the inner lining of the windpipe, commonly called the "weasand" and which at present is used for sausage casing. It is also possible for a careless cut to penetrate in such a way that some of the blood will flow into the abdomen and other cavities, and if free draining is not possible from these cavities, so-called "bloody necks" or "bloody shoulders" are the result. It is therefore to be observed that the correct sticking operation necessitates considerable skill and is important from an economic point of view.

After the sticking operation has been performed, the animal is moved along the trolley to the heading station and at the present time, during this interval of its movement, the blood gushes forth and falls upon the floor where it is washed down into the non-edible department. During the operation of large packing houses in which thousands of animals are killed each day, the animals are conveyed back and forth to the various operating stations upon the killing floor in regular operation so that the sticking and draining of the blood from the animal under slaughterhouse conditions can occupy a period of only about a minute without interfering with and hindering the sequence of operations in the slaughterhouse.

Prior to the present invention, this blood flowed upon the floor and was washed down into the inedible department to be worked up into the fertilizer or animal food. The small amounts of blood which are used for purposes other than fertilizer or animal food are recovered and treated for the production of albumen for industrial uses in the manner above described. This blood is either stirred immediately to take out the clotting fibrin or the clotted blood is cut up and left on draining tables for the serum to drain away from the clot. In either case some care is taken to keep the floor flushing water away from the blood to prevent destruction of the red corpuscles but it is impossible to prevent contamination by drippage from the animals either from their hides or the excretory or other organs. From a food standpoint, the blood is considered by government meat inspectors as unfit for human consumption if it runs along or in any way comes in contact with the exterior of the animal's hide or even if the blood is touched by human hands. From the standpoint of color, it takes but very little drippage in the blood to cause the serum produced to be deep red and it is commercially impracticable in stirring or defibrinating the blood to prevent mechanical rupture of the red corpuscles sufficient to color the serum. Commercial albumen at present on the market is of varying degrees of redness, is strong smelling and unfit for food for the above reasons.

According to the present invention, each animal after being stunned and hoisted by one or both of its hind legs into a position with its head hanging down is moved out on to the killing floor in the usual manner into the butchering position. Then the butcher makes a preliminary cut in the neck of the animal and thereafter inserts the knife in the usual manner so as to sever the arteries and veins near the so-called jugular bifurcation. Provision is made at this time for the insertion of a conduit into the wound so that the blood stream is directed through the interior of the conduit and away from possible contamination by drippings from the hide of the animal or from other sources and to enable it to be caught in a prepared container as the blood stream emerges from the conduit. To this end, the butcher uses a knife 10 comprising a hollow handle 12 and upon one end of which the usual butchering blade 14 is affixed.

The illustrated butchering knife, and which is preferably employed, forms the subject matter of an application filed by F. C. Atwood on even date herewith. As the blood stream emerges from the handle of the knife it is caught within a prepared receptacle 20 preferably in the form of a wide mouth milk can and which is held in approximately the illustrated position by a second operator. The receptacle 20 is provided with and contains a predetermined quantity of an anticoagulant as will be described. With this method of slaughtering the animal, there is practically no chance of contamination of the blood in any way because the collected blood is prevented from contact with the outside of the hide and no collected blood ever comes in contact with the outside part of the first cut. This preliminary cut makes it possible to effect the final cut without causing contamination from the outside into the part of the final cut with which the blood comes in contact. The foregoing method of slaughtering the animal enables the blood from each to be collected within a very short period of time, approximately 30 seconds, while the animal is being butchered and during the course of its movement into the next dressing station, to wit, the heading station. The knife preferably used may be wielded in exactly the same manner as the ordinary butchering knife so that the present method in no way interferes with the usual routine operations of handling and dressing the cattle upon the killing floor of the slaughterhouse.

It should be observed that according to my method of killing the animal and collecting the blood it is possible to kill all the animals in sequence as they are commercially killed without substantially interfering with killing routine, and to collect the blood from substantially all the animals so killed. Heretofore it has been impossible to do this except by those methods which, of necessity, allow the blood to become grossly contaminated and rendered unit for food purposes, and furthermore such contaminations always cause a certain destruction of the blood corpuscles so that any serum or albumen produced is red in color. Care must be taken that the vapors arising from the warm blood immediately after catching do not condense on the upper portions of the receptacles 20 or on the under sides of the covers therefor and run back into the blood. Specially designed covers are provided to eliminate such danger. Such covers are illustrated in Fig. 1, and comprise a protecting cap supported by a neck portion arranged to permit air currents to pass under the cover and into the can to thereby eliminate condensation on the under side of the cover and in the neck of the container. The effect of the introduction of such moisture is to cause sufficient hemolysis and the accompanying production of red color to render the products unfit for edible purposes. It is important that this condensation be prevented as its color effect is as great as the introduction of moisture from drippage from the animal during the collection process. In addition to the liability of the introduction of moisture from condensation upon the sides of the containers 20 there is always a danger of hemolysis due to moisture or water upon the butchering knives. I have found that dipping the knives prior to their use in salt water of a concentration such that its introduction into the blood does not cause hemolysis affords a successful and practical method of eliminating this danger.

As is well known, whenever blood of an animal emerges from the body it tends to coagulate into a jelly-like mass in a very few minutes. In order to prevent this coagulation of the blood within the receptacles 20 to thereby permit the receptacles to remain upon the slaughterhouse floor until the particular animals from which the blood was obtained have been completely inspected by the government inspector so that the receptacles may be released, an anti-coagulant, preferably comprising a salt solution, is placed within the receptacles so that when the blood is caught coagulation is retarded. As the blood of each animal is caught in an individual receptacle 20, the receptacle is tagged and the animal from which the blood is caught is tagged with a corresponding number or other means of identification, so that when the animal in the further course of the dressing operations upon the killing floor passes the final government inspector, the tag is removed from the animal by the inspector and thereafter the particular receptacle is released and permitted to be removed from the killing floor. Should a particular animal not pass inspection, then the blood caught therefrom is thrown away and usually washed down into the non-edible department. In practice, the prepared containers are transported to the killing floor upon a conveyor or truck, such as illustrated in Fig. 1, and as the blood is caught, the blood containing receptacles are placed upon the truck until a series of animals have been finally inspected and a lot of containers released by the inspectors. Thereafter the truck and containers are transported for further treatment in another portion of the slaughterhouse building or elsewhere. The retention of the collected blood upon the killing floor pending inspection of the animals may be varied according to the rigidity of the inspectors' regulations. If permissible such blood might with advantage be stored during the inspecting period in refrigerators or coolers.

The foregoing procedure by which the blood is obtained upon the killing floor of the slaughterhouse in a manner free from contamination may be modified, if desired, with respect to the anti-coagulant used within the containers for the prevention of the clotting of the blood as it leaves the animal and so that the blood may thereafter be subjected to further treatment. If the products to be obtained are to be used for non-edible purposes, then while an edible anti-coagulant such as a solution of sodium citrate may be employed, other non-edible anti-coagulants may be used, such as sodium fluoride solutions. The products, however, which may be produced from blood caught upon the killing floor, according to the foregoing method, possess important advantages over the foul smelling impure products upon the market. The process for producing these present commercial products upon the market has been previously discussed and will be more fully discussed below, and it is shown that by such methods the product is necessarily contaminated in such a way that a certain amount of red color is always present in the blood albumen produced and these impurities also cause a certain amount of insolubility and render the products disagreeable as to odor. It is to be seen, therefore, that the present invention offers the step of collecting the blood in a clean, uncontaminated manner upon the killing floor of the slaughterhouse, which controls, to a large extent, the ultimate qualities in the products produced therefrom.

The blood is now in condition for further treatment for the production of edible products free, or substantially free, from the objectionable red color which has heretofore accompanied the production of albumens from animal blood. The separation of the red corpuscular matter from the clear serum portion is preferably accomplished by passage of the blood through a centrifuge of the continuous type and within which the separating operation is carried on under certain definite conditions by means of which the usual red coloration is avoided in the serum portion of the effluent from the centrifuge. Referring to the drawings, the centrifuge in which it is preferred to accomplish the complete separation of the red corpuscular matter comprises in general an elongated bowl 30 suspended from the end of the shaft 32 adapted to be driven in the usual manner by a turbine 33 at high speed. The blood to be separated is introduced directly from the containers in which it is caught upon the killing floor through a conduit 36 and delivery nozzle 38 to the interior of the bowl 30 at its lower end. The delivery nozzle 38 terminates sufficiently near the lower end of the interior of the bowl 30 as to insure that the entering blood stream passes into the bowl without encountering any portion of the metal of the rotating bowl itself. During the centrifuging operation the red corpuscular matter is thrown to the outside, leaving the light colored solution as an annular layer nearer the center. Both layers are withdrawn from the upper part of the bowl 30 through discharge passages 40, 42 leading into and communicating with discharge nozzles 44, 46 as shown. The separated products are collected in relatively large containers, not shown.

During the operation of the centrifuge, the blood stream is delivered directly into the interior of the bowl 30 near its lower end. The blood within the bowl 30 assumes a cylindrical shape because of the action of centrifugal force thereon, so that the entering blood stream initially impinges upon a wall of blood as the stream leaves the delivery nozzle. During the continued operation of the centrifuge the entering blood is gradually brought up to the speed of the bowl by contact with the liquid wall of blood between it and the wall of the bowl 30. In practice the blood stream will have traversed upwardly to somewhere near the mid portion of the bowl during the interval that it is being brought up to speed. The interior of the bowl 30 from the delivery nozzle to the point in the bowl 30 where the blood stream attains the speed of the bowl is purposely made devoid of all obstructions. This construction of apparatus, it will be observed, enables the entering blood stream to be brought up to speed solely by means of a liquid cushion and in this manner the smashing of the red corpuscles characteristic of the effect of known centrifuges is entirely avoided.

The problem of completely separating the red corpuscular matter from the clear liquid portion of the blood is rendered particularly difficult because of the ability of a very small quantity of hemoglobin to color such clear liquid portion. In endeavoring to secure a complete separation by means of the centrifuges at present upon the market considerable difficulty was encountered even though all of the above mentioned conditions as to the design of the lower part of the centrifuge bowl were carefully maintained. The cause of the red coloration imparted to the effluent was, after much study and investigation, found to reside in the air currents passing upwardly through the interior of the centrifuge from around the delivery nozzle. These air currents even though relatively small seem to have the effect of carrying a portion of mist of whole blood from the entering blood stream upwardly through the central portion of the centrifuge where it was mixed with the separated clear liquid portion. In addition the passage of the air currents in this manner seemed to operate to induce mixing between the separated portions of blood and to, in this manner, interfere with the desired complete separation. The occurrence of such air streams may be successfully prevented in different ways as, for example, by closing the openings through which such air currents were introduced into the bottom of the bowl around the delivery nozzle, and for this purpose the delivery nozzle 38 and its supporting casing 50 are, in the centrifuge illustrated in the drawing, formed integrally in a manner such that the casing completely seals the space surrounding the delivery nozzle and through which the objectionable air currents were, in the commercial centrifuges found to pass.

The usual practice in the construction of centrifuges of the type illustrated in the drawing contemplates the provision of vanes 54 affixed to the rotating bowl and which serve to assist in maintaining the blood rotating at the speed of the bowl. Such vanes at their tops present surfaces favorable for the conduction, by capillarity or surface tension or a similar force, of some of the red corpuscles from the outer portions of the bowl inwardly against centrifugal force into the clear liquid portion which has been completely separated from the red corpuscles. The effect of such traverse or creeping of the red corpuscles along the surfaces at the top of these vanes was to impart sufficient objectionable red coloration to the effluent as to render it unfit for use as a food base. This objectionable feature is overcome in the present instance by the provision of a dam 56 comprising a tapered conical structure arranged to form a tapered passage leading directly to the discharge outlet through which the red corpusclar matter is withdrawn from the centrifuge. The inner portions of the dam terminate at approximately the boundary wall between the clear liquid and the red corpuscular matter in an opening formed by cut-away portions of the vanes themselves. In this manner a very indirect path is afforded for the transverse of the red corpuscles from the upper portion of the bowl near the discharge outlets. The contact of the vanes with the red corpuscular matter is at the top of the vanes limited to a point spaced a considerable distance from the boundary wall of the clear liquid portion. The portion of the dam 56 included in the opening formed by the cut-away portions of the vanes does not seem to exert sufficient action upon the red corpuscular matter to overcome the tremendous centrifugal force tending to throw such matter to the exterior of the bowl and toward the discharge outlets. Any red corpuscles which actually do traverse around the end of the dam find themselves in a secondary chamber 58 immediately upon the dam, in which the centrifugal force operates to throw them to the outside, thus permitting the clear fluid portion to pass out through its discharge nozzle entirely uncontaminated by any red corpuscles. At the end of each day's run the centrifuge is cleaned and whatever red corpuscular matter accumulates in the secondary chamber is removed at this time.

The straw yellow effluent resulting from the centrifuging operation is free from or contains so little hemoglobin as to be entirely devoid of any suggestion of the objectionable red color of blood. This effluent comprises a solution of the plasma proteins of the blood of a plurality of food animals and for this reason succeeding quantities of it produced by the present process are of a high degree of uniformity not only as to color but also as to composition. The ratios of blood sugar and fat to its protein content are very definite and enable the product to be successfully used as a food base. The uniformity of its composition due to the fact that it is derived from the blood of a series of animals as distinguished from the blood of a single isolated animal is a very important distinction from the viewpoint of standardization by the baker or other person using this product or any subsequent products derived therefrom. This plasma solution has a gravity of approximately 4½″ Bé. and contains about 9% solids, including small amounts of such salts as chlorides, carbonates, sulphates and phosphates of sodium, potassium, calcium, magnesia and iron. The bacterial content of this product is relatively low, being lower than that of bulk fluid or frozen egg white of the American market. As a consequence of the improved methods of producing this product its stability is exceedingly high. This product finds use as a general food base for all sorts of culinary purposes in which its physical characteristics at high nutritious value may be used with advantage.

For some purposes it may be desired to separate the fibrin from the foregoing product and for this purpose it is defibrinated in any of the known ways as, for example, by recalcifying, by the addition of calcium salts and stirring. The fibrin may then be removed from the solution as, for example, by filtration and subsequent clarification in a centrifuge; these operations producing a dilute product containing the serum proteins of the blood of a plurality of food animals; likewise entirely free from the objectionable red color of blood; and of high sterility and stability. For general purposes of handling and shipment this dilute straw yellow solution containing the serum proteins may be converted into the form of a dry solid. This operation may be performed in any desired way as, for example, by spray drying or shelf drying in known forms of apparatus. I have also found that this dilute product may be, by careful evaporation, concentrated to a viscous liquid possessing improved keeping qualities and as such comprises a marketable and valuable food base.

Both of the dilute products,—namely the solution of the plasma proteins and the solution of the serum proteins,—find use as general food bases for the preparation of many sorts of food materials as, for example, in soups, drinks, salad dressings and all sorts of prepared foods, as well as ingredients of foods prepared in ordinary cookery. The dried product may be shipped to the baker or other user and conveniently dissolved in water to form a solution capable of use for all of the purposes that the dilute solution of the serum proteins from which it is derived may be used. The solubility of the dried product produced by my improved process is very high and is not appreciably affected by age.

Without departing from the scope of the invention there are further modifications of the procedure for handling the blood as it is obtained upon the killing floor of the slaughterhouse which are sometimes desirable. Instead of being caught in separate containers the blood from two or three or more animals may be caught in the same container or may be mixed together after being caught, but it is always to be understood that if any one animal is condemned then the total lot of blood with which the blood from that animal was mixed must be thrown away.

Blood as it is drawn from the animals in conformity with the present invention is at the temperature of the animal. It has been found that if such blood is allowed to stand before separation certain odors and tastes become fixed in certain portions of the blood products which remind the user of such products of its beef origin. For some purposes this is offensive and undesirable. This may be prevented by chilling the blood immediately upon being caught. The reason for this is not well understood, but it is believed to be due to the fact that certain enzymes in the blood act in the absence of cooling to produce products having odors and tastes. I prefer, therefore, to set the cans containing the caught blood on a truck in some chilled container, so that the heat is reduced as rapidly as possible. Then, even though heat may be applied in other parts of the processing of the blood, the offensive taste or odor is not developed. It will be observed that during the handling of the blood upon the killing floor of the slaughterhouse it is maintained in such condition as to permit the rejection of the blood of the diseased animals which do not pass the rigid government inspection. Thereafter during the centrifuging operation and during the collection of the clear straw colored product opportunity is afforded for the complete mixing of the blood of a series of animals. This is of particular advantage for the following reasons: Plasma as it comes from the animal body is composed of a very large number of materials, most of which are present in small quantities as compared with the protein content. Most of these components are present in different amounts in different animals, and even in the same animal the quantity of any one element may vary from day to day. Since very considerable variations in a number of different qualities are possible it is obviously an advantage to obtain a more nearly standard product by mixing the plasma from a large number of animals. The food materials which an animal eats are carried in the blood until the function which they are to perform is accomplished. The composition of the blood, therefore, and more particularly the plasma, varies according to the length of time which elapses between feeding the animal and slaughtering it. This variation shows up more particularly as regards the fat content of the blood. If the animal has not eaten for some time before slaughtering then the plasma is very clear. If the animal has eaten recently then the plasma will be cloudy and opalescent. The vitamine content and the sugar content of the plasma will vary for the same reasons. The salt content of the blood will vary for a similar reason and for the additional reason that salt may be introduced during the operation of catching the blood, and this content will vary according to the quantity of blood caught per animal. The color of the plasma varies very markedly during the different seasons of the year and to some extent according to the feeding of the animal. Greater variations in color are perhaps noticeable as between types of animals. Plasma from bulls will be very heavy, quite dark in color and somewhat stronger smelling than plasma from steers or cows. The plasma from cow blood is particularly light colored and in general is much thinner. Fibrin content is another variable which changes from day to day in any one animal and varies quite markedly in different animals and accounts for the difference between the viscosity of cow blood and bull blood.

While the different features of the invention have been described in their preferred forms, it is to be understood that they may be embodied in other forms within the scope of the following claims.

Having thus described the invention, what is claimed is:

1. The commercial method of producing a protein product comprising gathering the blood from a plurality of food animals during the commercial slaughtering routine in a manner such as to prevent the formation of free hemoglobin therein, retarding coagulation of the gathered blood and thereafter passing a stream of animal blood containing practically no free hemoglobin into the rotating bowl of a centrifuge of a continuous type, in a manner such that the blood stream initially encounters a slowly rotating body of liquid, bringing the blood stream up to the speed of the bowl solely by contact with a liquid surface and preventing passage of air currents through the centrifuge during its operation to thereby centrifugally separate the clear liquid portion of the blood substantially free from the red portion.

2. The commercial method of producing a protein product comprising gathering the blood from a plurality of food animals during the commercial slaughtering routine in a manner such as to prevent the formation of free hemoglobin therein, retarding coagulation of the gathered blood, and thereafter passing a stream of animal blood containing practically no free hemoglobin into the rotating bowl of a centrifuge of a continuous type, in a manner such that the blood stream initially encounters a slowly rotating body of liquid, bringing the blood stream up to the speed of the bowl solely by contact with a liquid surface to thereby centrifugally separate the clear liquid portion of the blood substantially free from the red portion.

3. In a process for producing protein products the steps of separating the clear portion of animal blood from the red portion which consist in passing a stream of animal blood containing practically no free hemoglobin into the rotating bowl of a centrifuge of a continuous type, in a manner such that the blood stream initially encounters a slowly rotating body of liquid, bringing the blood stream up to the speed of the bowl solely by contact with a liquid surface and preventing passage of air currents through the centrifuge during its operation to thereby centrifugally separate the clear liquid portion of the blood substantially free from the red portion.

4. In a process for producing protein products the steps of separating the clear portion of animal blood from the red portion which consist in passing a stream of animal blood containing practically no free hemoglobin into the rotating bowl of a centrifuge of a continuous type, in a manner such that the blood stream initially encounters a slowly rotating body of liquid, bringing the blood stream up to the speed of the bowl solely by contact with a liquid surface to thereby centrifugally separate the clear liquid portion of the blood substantially free from the red portion.

WILLIAM BURTON WESCOTT.